July 31, 1945.                S. SCHNELL                2,380,795
                      BRAKE SHOE ADJUSTING MEANS
                       Filed July 26, 1943        2 Sheets-Sheet 2
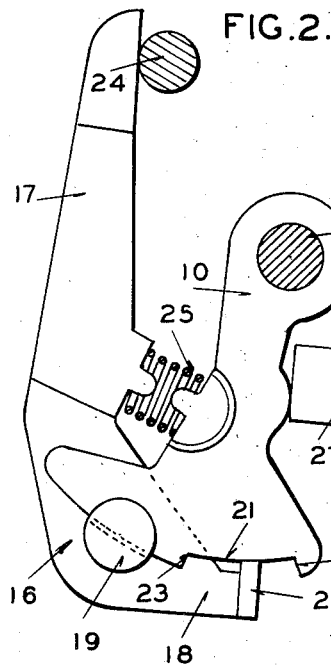
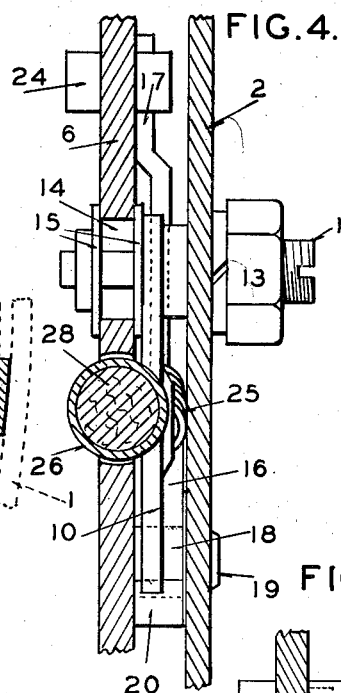
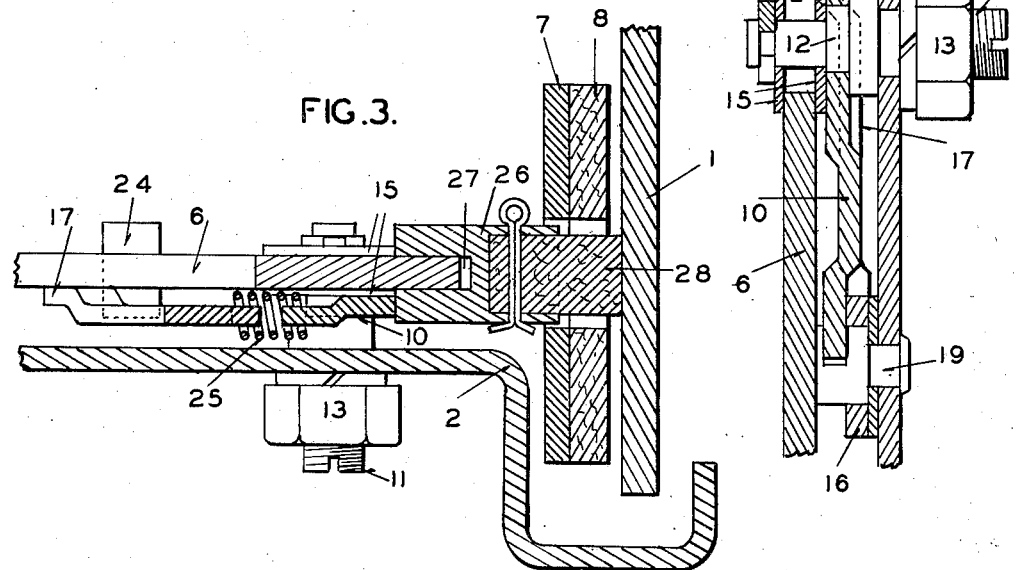
INVENTOR
S. SCHNELL
BY
ATTORNEY Patented July 31, 1945

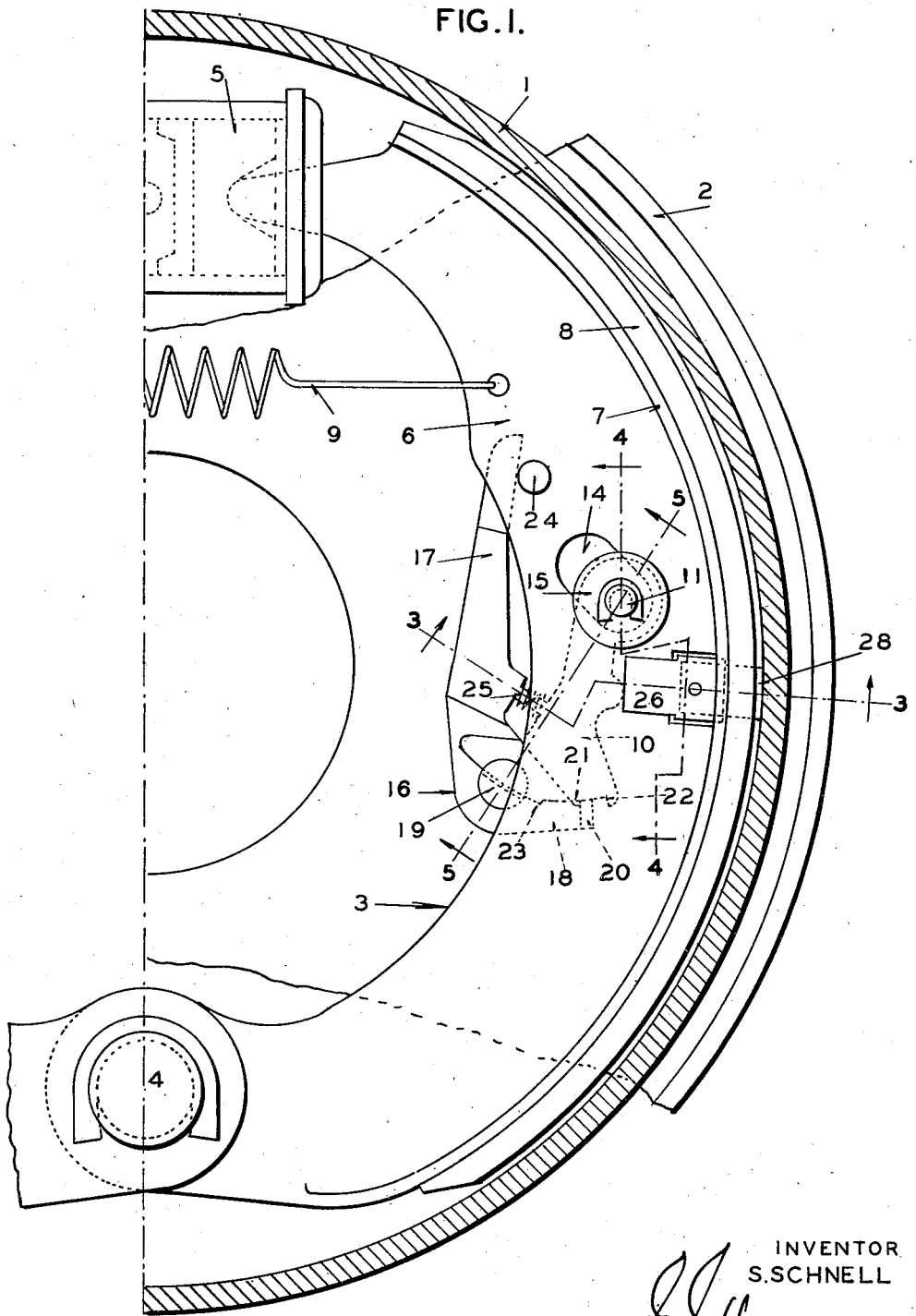

2,380,795

UNITED STATES PATENT OFFICE 2,380,795

BRAKE SHOE ADJUSTING MEANS

Steve Schnell, Kirkwood, Mo., assignor to Wagner Electric Corporation, St. Louis, Mo., a corporation of Delaware Application July 26, 1943, Serial No. 496,118

17 Claims. (Cl. 188—79.5)

My invention relates to brakes and more particularly to improved adjusting means for a brake shoe thereof.

One of the objects of my invention is to provide improved brake shoe adjusting means which will be automatically operable to maintain the "off" position clearance of the shoe substantially constant regardless of lining wear or contraction and expansion of the drum due to changes in temperature.

Another object of my invention is to provide an improved brake shoe adjusting means which can be set to give an initial "off" position clearance for the shoe when installed and will function throughout the life of the shoe lining to maintain such clearance under all conditions.

Yet another object of my invention is to provide an adjusting means for a brake shoe which will function to make an adjustment when the drum expands due to increasing temperature and will also make adjustments as the drum again assumes its normal condition to thus maintain a predetermined "off" position clearance for the shoe at all times.

Other objects of my invention will become apparent from the following description taken in connection with the accompanying drawings in which Figure 1 is a view of part of a brake assembly having a shoe adjusting means embodying my invention; Figure 2 is an enlarged view showing the different parts of the adjusting mechanism; and Figures 3, 4, and 5 are sectional views taken on the lines 3—3, 4—4, and 5—5, respectively, of Figure 1.

Referring to the drawings in detail, numeral 1 indicates a brake drum secured to rotate with the wheel of the vehicle and 2 a fixed backing plate or support for closing the open side of the drum. A brake shoe 3 is provided for cooperation with the drum, said shoe having its lower or heel end pivotally mounted on the backing plate by means of an anchor pin 4 and being actuated at its toe end by a fluid motor 5 secured to the backing plate. The fluid motor is actuated by fluid under pressure from a remote source as is well-known practice. The brake shoe comprises a web 6 and a lining carrying flange 7 to which is secured the lining 8 for cooperation with the drum surface. The brake shoe is retracted from the drum by a retracting spring 9 which is connected between the brake shoe 3 and the companion brake shoe (not shown) of the brake assembly.

The brake shoe adjusting mechanism embodying my invention has an arm 10 pivotally mounted on the backing plate by means of a pin 11. This pin is provided with an eccentric portion 12 on which the arm is journaled and the pin is clamped to the backing plate by means of a nut 13. The inner end of the pin extends through an opening 14 in the web of the brake shoe and carries washers 15 cooperating with the opposite sides of the web for guiding and steadying the shoe. By loosening the nut 13, pin 11 can be rotated to change the pivotal axis of arm 10.

Also mounted on the backing plate is an L-shaped lever 16 pivoted at the juncture of its arms 17 and 18 by means of a pin 19 carried by the backing plate. The arm 18 of the lever has a lateral extending portion 20 on its end to extend beneath the end of arm 10. This end of arm 10 has a cam surface 21 with which the extension 20 cooperates. The cam surface 21 is between two shoulders 22 and 23 which cooperate with extension 20 to limit the rotative movement of arm 10. When engaging with cam surface 21, extension 20 prevents any counter-clockwise rotation of lever 16 about its pivot 19. Thus arm 17 of the lever can act as a stop to determine the "off" position of the brake shoe and in order to perform this function, the brake shoe carries a pin 24 which can engage the end of arm 17 of lever 16. Lever 16 and arm 10 have interposed between them a coil spring 25 which acts to move arm 10 with respect to lever 16 and adjust cam surface 21 with respect to extension 20. When arm 10 is caused to be moved relatively about its pivotal axis in a counter-clockwise direction relative to lever 16, cam surface 21 will adjust lever 16 and cause the upper end of arm 17 of said lever to be moved in a direction toward the shoe, thus making an adjustment of the "off" position of the brake shoe. If arm 10 should be moved in a clockwise direction relatively to lever 16, arm 17 of said lever will be moved in a direction away from the shoe, thus making an adjustment of the "off" position of the shoe.

The brake shoe lining carrying flange 7 and web 6 are cut away to provide for the mounting of an adjusting plunger 26 which has a slot 27 for receiving the web of the shoe (see Figure 4). The shoe lining also has an opening coinciding with the opening in the lining carrying flange of the shoe and carried by the plunger 26 is a plug 28 of friction material projecting through the lining opening in order to contact with the drum surface at all times. Plunger 26 engages with the central portion of arm 10 and controls the movement of said arm. The plunger and the friction plug are so arranged that when the plug is flush with the surface of the lining, the plunger will engage the web at the bottom of its slot 27. When the shoe is retracted from the drum and pin 24 engages arm 17 of lever 16, the web of the shoe will be spaced from the bottom of slot 27 a distance which will be equal to that of the "off" position clearance desired for the shoe.

Referring to the operation of the adjusting mechanism, arm 10 and lever 16 are first pivotally mounted on the backing plate and then plunger 26 mounted on the shoe in the cut away portion of the lining carrying flange and the web. In making the original adjustment the plunger is pushed inwardly so that the bottom of its slot 27 engages the web of the shoe and then the material of plug 28 is ground so that it is flush with the surface of the brake lining. Next the adjustable pin 11 is adjusted so that arm 10 forces plunger 26 outwardly and the end surface of the plug extends beyond the lining surface the distance desired for the "off" position clearance of the shoe with respect to the drum. When this adjustment is completed, nothing else need be done throughout the entire life of the brake lining as all adjustments thereafter will take place automatically.

When the brake shoe is released from the drum, pin 24 will engage the end of arm 17 which is held from movement by the engagement of extension 20 with surface 21. The friction engagement between extension 20 and the cam surface 21, together with spring 25, will hold arm 10 in its position where the plug 28 of the plunger engages with the drum. When the brake shoe is applied to the drum, plunger 26 and plug 28 will not be moved relatively to the surface of the brake drum. However, the shoe will be moved relatively to the plunger and plug and since the clearance between the shoe and the drum is the same as that between the web and the end of slot 27, the web will move to the bottom of the slot and the plug will be held in engagement with the drum surface with the same pressure as the lining.

If there is lining wear, there will also be a like amount of wear of the material of the plug. Consequently, as the lining carrying flange of the shoe moves closer to the drum due to lining wear, the plunger will be moved slightly away from arm 10 and this will permit spring 25 to become effective and cause arm 10 to follow the plunger. Since pin 24 on the shoe does not engage arm 17 when the brake shoe is applied, there will be no heavy friction between cam surface 21 and extension 20 and the movement of the arm can take place freely. With the new setting of cam surface 21, the upper end of arm 17 will be moved in a direction toward the shoe to establish a new "off" position for the shoe. The cam surface 21 is so arranged with respect to the pivotal axis of arm 10 that for each increment of lining wear there will be such a movement of arm 10 as to cause the end of arm 17 of the lever to be moved in a direction toward the shoe the same increment.

If, during brake shoe application, there should be an expansion of the drum due to increased temperature, an adjustment will take place in the same manner as when the lining wears since the plunger will move sufficiently to cause a following movement of arm 10. When the shoe is released, the "off" position clearance of the lining with respect to the drum will not be altered. After an adjustment caused by heating is made and there are no more brake shoe applications, the drum will cool and contract. When contraction occurs, the drum surface will push plunger 26 inwardly and cause arm 10 to be rotated slightly in a clockwise direction. This will shift the cam surface with respect to extension 20 so that arm 17 of lever 16 will be moved in a direction away from the shoe the same distance that plunger 26 is shifted inwardly by the over-powering force of the contracting drum. It is thus seen that the contracting of the drum causes a re-adjustment of the drum to take place so that the "off" position of the shoe will continue to have the same clearance with respect to the drum surface. This re-adjusting continues until the drum has so contracted as to regain its normal condition.

From the foregoing it is seen that there has been provided an adjusting mechanism which will automatically take care of all necessary adjustments to compensate for lining wear and also expansion and contraction of the drum. Regardless of what occurs, the brake shoe, when released from the drum, will always have a predetermined clearance with respect to the drum. When the adjusting mechanism is originally set, the operator is not required to do any more adjusting throughout the entire life of the lining.

When the brake lining approaches a worn out stage, shoulder 23 is so arranged that it will engage extension 20 and cause adjusting operations to cease. This will be a warning to the operator that the lining is about worn out as he will be aware that more pedal movement is required to move his brake shoes into engagement with the drum as the "off" position clearance of the shoe steadily increases when there is no automatic adjustment. He can then have his brake shoes relined. The material of the plug is preferably made of slightly harder material than the brake lining since the drum rubs on it when the brakes are released. The rubbing, however, only occurs on the high spots of the drum surface. Any jarring of the brake when the shoe is disengaged from the drum will not affect the adjustment. Under released condition of the brake shoe it is to be noted that the strong retracting spring is pulling on the brake shoe and, consequently, also acts on lever 16 due to the arm thereof being engaged by pin 24. With this pull on lever 16, extension 20 on arm 18 of the lever is held firmly against the cam surface 21, thus preventing any movement of arm 10. Spring 25 also aids in maintaining the adjustment since its force acts to place a slight pressure on the plunger and maintain the plug thereof in light contact with the drum.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a brake shoe adjusting mechanism; a support; a brake drum rotatable with respect to said support; a brake shoe having a friction element thereon movable into operative and inoperative association with said drum; a second friction element movable relatively to said shoe and in constant engagement with said drum; a member mounted solely on the support and cooperating with said second friction element for determining the clearance between said drum and brake shoe; and means on said support for associating said member, said shoe and said second friction element for so moving said member when there is wear on the friction surface of said second friction element or when said shoe has movement relative to the support that the disengaged clearance of the friction element on the shoe with respect to the drum will remain constant.

2. In adjusting mechanism, a support, two friction elements one of which is movable to engage with and be disengaged from the other and said other element having movement with respect to the support resulting from the engagement of the two elements, a member associated with the support and cooperating with the engaging and disengaging movable element for determining the clearance between the elements when disengaged, and means for so automatically moving the member when said other element has movement relative to the support that the disengaged clearance of the elements will remain constant, said last named means comprising a control element carried by the movable element and in constant contact with said other element, said movable element having relative movement with respect to the control element throughout the entire engaging and disengaging movement of said movable element.

3. In an adjusting mechanism for a brake; a support; a drum rotatable with respect thereto; a first friction element selectively engageable with said drum; a second friction element movable with respect to said first friction element and in constant engagement with said drum; a lever pivotally mounted on the support and having a part cooperating with one of said friction elements for determining the clearance between said first friction element and said drum; and means for moving said lever relatively to said support and said friction elements to maintain the disengaged clearance constant between one of said elements and said drum.

4. In an adjusting mechanism for a brake to maintain a constant clearance between a brake shoe and a brake drum; a support; a brake drum rotatable with respect to said support; a brake shoe pivotally mounted on said support for selective engagement with said drum; a friction element transversely movable with respect to said shoe and in constant engagement with said drum; said friction element governing the clearance between said drum and said shoe; cooperating means between said shoe and said support; cooperating means between said friction element and said shoe; and means coordinating said two cooperating means such that a movement in said shoe or in said friction element will adjust the other to govern the clearance between said shoe and said drum.

5. In adjusting mechanism for a brake, a support, a drum, a brake shoe for engagement with and disengagement from the drum, a member pivotally mounted on the support and engageable by a shoe part when disengaged from the drum, and means movable transversely of said shoe in engagement with said drum for automatically moving said member about its pivot relative to said shoe and drum so that the clearance between the shoe and the drum when the shoe is disengaged will be substantially constant regardless of wear of the shoe friction surface or change in diameter of the drum.

6. In adjusting mechanism for a brake, a support, a brake drum, a brake shoe for engagement with and disengagement from the drum, a member pivotally mounted on the support and engageable by a shoe part when disengaged from the drum, and means for automatically moving said member about its pivot, said last named means comprising an element carried by the shoe and in constant engagement with the drum.

7. In adjusting mechanism for a brake, a support, a brake drum, a brake shoe for engagement with and disengagement from the drum, a member pivotally mounted on the support and engageable by a shoe part when disengaged from the drum, and means for automatically moving said member about its pivot and in a direction toward the shoe when there is wear of the friction surface of the shoe, said means comprising an element in constant contact with the drum and so mounted on the shoe that the shoe will move relatively thereto during its engaging and disengaging movement and said element will be caused to wear and move with the shoe as the friction surface of said shoe wears.

8. In adjusting mechanism for a brake, a support, a brake drum, a brake shoe for engagement with and disengagement from the drum, a member associated with the support and engageable by a part of the shoe when disengaged from the drum, and means for automatically moving said member so that the clearance between the shoe and the drum when the shoe is disengaged will be maintained constant regardless of drum expansion or contraction due to changes in temperature, said last named means comprising an element mounted on the support and an element carried by the shoe and in constant engagement with the drum for changing the position of said member as the drum expands and contracts.

9. In adjusting mechanism for a brake, a support, a brake drum, a brake shoe for engagement with and disengagement from the drum, a member associated with the support and engageable by a part of the shoe when disengaged from the drum, and means for automatically moving said member so that the clearance between the shoe and the drum when the shoe is disengaged will be maintained constant regardless of drum expansion or contraction due to changes in temperature, said last named means comprising a control element carried by the shoe and in constant engagement with the drum, said shoe having relative movement with respect to the control element throughout the entire engaging and disengaging movement thereof.

10. In adjusting mechanism for a brake, a support, a drum, a brake shoe mounted on the support, a lever pivoted on the support and having a part spaced from its pivot for engagement by a part of the shoe when retracted, an arm pivoted on the support, means carried by the lever and arm for preventing movement of the lever when engaged by the shoe and thereby determine the "off" position of the shoe, said last named means also being so arranged that movement of the arm relatively to the lever will permit change of position of the lever to change the "off" position of the shoe, and means for moving the arm in accordance with wear of the friction surface of the shoe.

11. In adjusting mechanism for a brake, a support, a drum, a brake shoe mounted on the support, a lever pivoted on the support and having a part spaced from its pivot for engagement by a part of the shoe, an arm pivoted on the support, said arm and lever being so associated that the arm will prevent movement of the lever when engaged by the shoe and thereby determine the "off" position of the shoe, cam means on the arm controlled by a movement of the arm relatively to the lever to permit change of position of the lever and the "off" position of the shoe, and means for moving the arm when there is wear of the friction surface of the shoe or change in the diameter of the drum.

12. In adjusting mechanism for a brake, a support, a drum, a brake shoe mounted on the support, a lever pivoted on the support and having a part spaced from its pivot for engagement by a part of the shoe, an arm pivoted on the support, said arm and lever being so associated that the arm will prevent movement of the lever when engaged by the shoe and thereby determine the "off" position of the shoe, cam means on the arm controlled by a movement of the arm relatively to the lever to permit change of position of the lever and the "off" position of the shoe, and means comprising an element carried by the shoe and in constant contact with the drum for controlling movement of the arm in accordance with any change in the diameter of the drum.

13. In adjusting mechanism for a brake, a support, a drum, a brake shoe mounted on the support, an L-shaped lever pivoted on the support and having one arm adapted to be engaged by a part of the shoe to determine the "off" position clearance of the shoe, an arm pivoted on the support and cooperating with the other arm of the lever for preventing movement of the lever when engaged by the shoe, said arm being provided with a cam surface with which said last named arm of the lever cooperates for controlling the positioning of the lever when the arm is moved about its pivot, and means for controlling the movement of the arm in accordance with wear of the friction surface of the shoe or change in diameter of the drum.

14. In adjusting mechanism for a brake, a support, a drum, a brake shoe mounted on the support, an L-shaped lever pivoted on the support and having one arm adapted to be engaged by a part of the shoe to determine the "off" position clearance of the shoe, an arm pivoted on the support and cooperating with the arm of the other lever for preventing movement of the lever when engaged by the shoe, said arm being provided with a cam surface with which said last named arm of the lever cooperates for controlling the positioning of the lever when the arm is moved about its pivot, an element carried by the shoe and engaged by the arm, spring means acting on the arm and biasing the element into constant contact with the drum, and cooperating means between the element and the shoe for causing the element to move with the shoe after the shoe has engaged the drum.

15. In adjusting mechanism for a brake, a support, a brake drum, a brake shoe mounted on the support, a retracting spring for the shoe, a lever pivoted on the support and having a part engaged by a part of the brake shoe when retracted from the drum, a movable member mounted on the support and cooperating with another part of the lever for preventing movement of the lever when engaged by the shoe and for changing the position of the lever to change the disengaged position of the shoe, and means extending transversely of said shoe in constant engagement with said drum for causing movement of the member when there is brake shoe friction surface wear or change in diameter of the drum.

16. In adjusting mechanism for a brake, a support, a brake drum, a brake shoe mounted on the support, a retracting spring for the shoe, a lever pivoted on the support and having a part engaged by a part of the brake shoe when retracted from the drum, a movable member mounted on the support and cooperating with another part of the lever for preventing movement of the lever when engaged by the shoe and for changing the position of the lever to change the disengaged position of the shoe, and means for causing movement of the member when there is brake shoe friction surface wear or change in diameter of the drum, said last named means comprising an element carried by the shoe cooperating with the movable member and constantly contacting the drum.

17. In a brake adjusting mechanism, a support, a brake drum in operative relation thereto, a pair of friction elements transversely movable relatively to each other and to said drum to engaged and disengaged positions, one of said elements selectively engageable with said drum and the other continuously engageable with said drum, a member mounted on said support having a portion movable relatively to said drum and substantially radially of one of said friction elements to determine the disengaged clearance of one of said friction elements relative to said drum, and means for moving said member relative to said support and one of said friction elements in the event of wear on said friction element to keep said disengaged clearance constant.

STEVE SCHNELL.